US007722713B2

(12) United States Patent
Green et al.

(10) Patent No.: US 7,722,713 B2
(45) Date of Patent: May 25, 2010

(54) CARBON BLACKS AND POLYMERS CONTAINING THE SAME

(75) Inventors: Martin C. Green, Boxboro, MA (US); Geoffrey D. Moeser, Reading, MA (US); Steven E. Brown, New Windsor, NY (US); Steven R. Reznek, Concord, MA (US)

(73) Assignee: Cabot Corporation, Boston, MA (US)

( * ) Notice: Subject to any disclaimer, the term of this patent is extended or adjusted under 35 U.S.C. 154(b) by 1008 days.

(21) Appl. No.: 11/130,838

(22) Filed: May 17, 2005

(65) Prior Publication Data

US 2006/0264561 A1  Nov. 23, 2006

(51) Int. Cl.
*C09C 1/44* (2006.01)
*C08K 3/04* (2006.01)
(52) U.S. Cl. .................... 106/472; 423/449.1; 524/495; 524/496
(58) Field of Classification Search ................ 106/472; 423/449.1; 524/495, 496
See application file for complete search history.

(56) References Cited

U.S. PATENT DOCUMENTS

| | | | |
|---|---|---|---|
| 3,229,507 A | 1/1966 | Sljaka et al. .................... 73/59 |
| 3,443,901 A | 5/1969 | Wendell et al. | |
| 3,627,677 A | 12/1971 | Dyrud ........................ 210/649 |
| 3,659,896 A | 5/1972 | Smith et al. .................... 296/93 |
| 3,764,527 A | 10/1973 | Sohl ........................ 210/671 |
| 4,071,496 A | 1/1978 | Kraus et al. ............... 260/42.36 |
| 4,088,628 A | 5/1978 | Bernstein et al. ......... 260/42.46 |
| 4,093,421 A | 6/1978 | Jerkins ....................... 23/259.5 |
| 4,167,110 A | 9/1979 | Kopito et al. ............... 73/54.22 |
| 4,237,725 A | 12/1980 | Kopito et al. ............... 73/54.22 |
| 4,255,296 A | 3/1981 | Ogawa et al. .................. 260/5 |
| 4,259,218 A | 3/1981 | Haws .......................... 260/5 |
| 4,360,627 A | 11/1982 | Okado et al. ................ 524/496 |
| 4,478,973 A | 10/1984 | Misono et al. ............. 524/496 |
| 4,540,560 A | 9/1985 | Henderson et al. ......... 423/445 |
| 4,548,980 A | 10/1985 | Nagata et al. ............... 524/495 |
| 4,678,830 A | 7/1987 | Sato et al. ................... 524/495 |
| 4,690,965 A | 9/1987 | Hirata et al. ................ 524/236 |
| 4,721,740 A | 1/1988 | Takeshita et al. ........... 523/215 |
| 4,878,379 A | 11/1989 | Deer ............................. 73/60 |
| 4,914,147 A | 4/1990 | Mouri et al. ................ 524/495 |
| 4,992,190 A | 2/1991 | Shtarkman ............... 252/62.52 |
| 5,093,407 A | 3/1992 | Komai et al. ................ 524/495 |
| 5,124,396 A | 6/1992 | Branan, Jr. et al. .......... 524/496 |
| 5,128,395 A | 7/1992 | Terakawa et al. ........... 524/274 |
| 5,162,421 A | 11/1992 | Ue et al. ..................... 524/495 |
| 5,190,739 A | 3/1993 | MacKay et al. ............. 423/450 |
| 5,194,488 A | 3/1993 | Piestert et al. .............. 524/703 |
| 5,211,932 A | 5/1993 | Blaylock et al. ............ 423/450 |
| 5,231,129 A | 7/1993 | Misono ...................... 524/496 |
| 5,232,974 A | 8/1993 | Branan, Jr. et al. ......... 524/495 |
| 5,288,788 A | 2/1994 | Shieh et al. ................. 524/495 |
| 5,292,790 A | 3/1994 | Shimizu et al. ............. 524/496 |
| 5,303,578 A | 4/1994 | Williams et al. ........... 73/54.24 |
| 5,310,777 A | 5/1994 | Sekido et al. ............... 524/496 |
| 5,321,072 A | 6/1994 | Misono ...................... 524/496 |
| 5,322,724 A | 6/1994 | Levens ........................ 428/57 |
| 5,322,874 A | 6/1994 | Fujii et al. .................. 524/227 |
| 5,352,289 A | 10/1994 | Weaver et al. .............. 106/476 |
| 5,362,794 A | 11/1994 | Inui et al. ................... 624/496 |
| 5,382,621 A | 1/1995 | Laube ........................ 524/496 |
| 5,405,623 A | 4/1995 | Barkalow et al. .............. 426/5 |
| 5,426,148 A | 6/1995 | Tucker ....................... 524/496 |
| 5,428,099 A | 6/1995 | Morrar et al. ............... 524/495 |
| 5,430,087 A | 7/1995 | Carlson et al. .............. 524/496 |
| 5,480,626 A | 1/1996 | Klasen et al. ............. 423/449.1 |
| 5,534,578 A | 7/1996 | Wideman et al. ........... 524/396 |
| 5,547,609 A | 8/1996 | Fujii et al. .................. 252/511 |
| 5,639,817 A | 6/1997 | Probst et al. ................ 524/496 |
| 5,643,991 A | 7/1997 | Stipe et al. ................. 524/496 |
| 5,652,298 A | 7/1997 | Murray ...................... 524/571 |
| 5,688,317 A | 11/1997 | Mackay et al. ............. 106/476 |
| 5,696,197 A | 12/1997 | Smith et al. ................ 524/495 |
| 5,705,555 A | 1/1998 | Guilfoy et al. ............. 524/495 |
| 5,714,096 A | 2/1998 | Dorfman .................... 252/511 |
| 5,723,531 A | 3/1998 | Visel et al. ................. 524/496 |
| 5,731,229 A | 3/1998 | Kato et al. ................... 438/50 |
| 5,733,480 A | 3/1998 | Lee et al. ................... 252/511 |
| 5,792,941 A | 8/1998 | Rye et al. .................. 73/53.01 |
| 5,801,209 A | 9/1998 | Chung et al. ................. 521/99 |
| 5,859,120 A | 1/1999 | Karl et al. .................. 524/495 |
| 5,877,250 A | 3/1999 | Sant ........................... 524/496 |
| 5,877,251 A | 3/1999 | Sant ........................... 524/496 |

(Continued)

FOREIGN PATENT DOCUMENTS

EP           0253290         1/1988

(Continued)

OTHER PUBLICATIONS

International Search Report and Written Opinion of the International Searching Authority for PCT/US2006/018723 dated Nov. 3, 2006.

(Continued)

*Primary Examiner*—Peter D Mulcahy (57) ABSTRACT

Carbon blacks which are useful in a variety of polymer compounds including ABS compounds are described, as well as methods of making the carbon blacks and polymer compounds. The carbon blacks provide desirable jetness and impact strength, as well as good dispersion in a polymer.

14 Claims, 1 Drawing Sheet

U.S. PATENT DOCUMENTS

| | | | | |
|---|---|---|---|---|
| 5,974,167 | A | 10/1999 | Reszler | 382/141 |
| 6,013,737 | A | 1/2000 | Takagishi et al. | 525/332.7 |
| 6,046,266 | A | 4/2000 | Sandstrom et al. | 524/492 |
| 6,056,933 | A | 5/2000 | Vogler et al. | 423/449.1 |
| 6,084,015 | A | 7/2000 | Chino et al. | 524/189 |
| 6,086,792 | A | 7/2000 | Reid et al. | 252/511 |
| 6,096,284 | A * | 8/2000 | Kanamaru et al. | 423/450 |
| 6,096,833 | A | 8/2000 | Araki et al. | 525/342 |
| 6,099,818 | A | 8/2000 | Freund et al. | 423/449.1 |
| 6,156,837 | A | 12/2000 | Branan, Jr. et al. | 524/495 |
| 6,224,713 | B1 | 5/2001 | Hembree et al. | 156/345.11 |
| 6,228,928 | B1 | 5/2001 | Soeda et al. | 524/495 |
| 6,277,350 | B1 | 8/2001 | Gerspacher | 423/449.1 |
| 6,391,274 | B1 | 5/2002 | Vogler et al. | 423/275 |
| 6,410,630 | B1 | 6/2002 | Hoover et al. | 524/365 |
| 6,448,309 | B2 | 9/2002 | Mahmud et al. | 523/215 |
| 6,494,946 | B1 | 12/2002 | Belmont et al. | |
| 6,652,918 | B1 | 11/2003 | Lee et al. | 427/387 |
| 6,690,179 | B2 | 2/2004 | Hajduk et al. | 324/663 |
| 2001/0036995 | A1 | 11/2001 | Mahmud et al. | 524/495 |
| 2002/0077409 | A1 | 6/2002 | Sakaki et al. | 524/496 |
| 2002/0107318 | A1 | 8/2002 | Yamada et al. | 524/495 |
| 2002/0156177 | A1 | 10/2002 | Freund | 524/496 |
| 2002/0173582 | A1 | 11/2002 | Schmidt | 524/504 |
| 2002/0189498 | A1 | 12/2002 | Nguyen et al. | |
| 2003/0097871 | A1 | 5/2003 | Mansky | 73/64.49 |
| 2003/0162876 | A1 | 8/2003 | Vanier et al. | 524/437 |
| 2003/0164027 | A1 | 9/2003 | Terrom | 73/64.48 |
| 2003/0219373 | A1 | 11/2003 | Foster | |
| 2004/0194537 | A1 | 10/2004 | Brown et al. | 73/54.01 |
| 2004/0197923 | A1 | 10/2004 | Reznek et al. | 436/55 |
| 2004/0197924 | A1 | 10/2004 | Murphy et al. | 436/55 |
| 2004/0198887 | A1 | 10/2004 | Brown et al. | 524/430 |
| 2004/0199436 | A1 | 10/2004 | Reznek et al. | 705/28 |

FOREIGN PATENT DOCUMENTS

| | | |
|---|---|---|
| EP | 0453625 | 10/1991 |
| EP | 0919801 | 6/1999 |
| GB | 2378716 | 2/2003 |

OTHER PUBLICATIONS

PCT/US2006/018723 Nov. 20, 2007 International Preliminary Report on Patentability.

Attachment A—Development History.

Strom, "Wetting studies related to offset printing," vol. 50-04C, pp. 768 (1988) Abstract only.

Hansen, "The three dimensional solubility parameter—key to paint component affinities: I. Solvents, Plasticizers, Polymers, and Resins," Journal of Paint Technology, vol. 39, No. 505, pp. 104-117 (1967).

Hansen, "The three dimensional solubility parameter—key to paint component affinities: II and III—II. Solvents, Plasticizers, Polymers, and Resins," Journal of Paint Technology, vol. 39, No. 511, pp. 505-510 (1967).

Hansen et al., "III. Independent calculation of the parameter components," Journal of Paint Technology, vol. 39, No. 511, pp. 511-514 (1967).

Hansen et al., "On the use of cohesion parameters to characterize surfaces," J. Adhesion, vol. 15, pp. 275-286 (1983).

Hansen, "Cohesion parameters for surfaces, pigments, and fillers," Surface Coatings International vol. 8, pp. 386-391, (1997).

Shareef et al., "Suspension interaction of pigments in solvents: characterization of pigment surfaces in terms of three-dimensional solubility parameters of solvents," Journal of Coatings Technology, vol. 58, No. 733, pp. 35-44 (1986).

Vinther, "Application of the concepts solubility parameter and pigment charge," Chemie des Peintures Engl, vol. 34, No. 10, pp. 363-372 (1971).

Schreiber, "Solvent Balance, Dispersion and Rheological Properties of Pigmented Polymer Compositions," Journal of Paint Technology, vol. 46, No. 598, pp. 35-39, Nov. 1974.

Burrell, "The challenge of the solubility parameter concept," Journal of Paint Technology, vol. 40, No. 520, pp. 197-208 (1968).

Trudgian, "The pattern of solvent-resin-pigment affinities," Official Digest, Presented at the 41st Annual Meeting of the Federation of Societies for Paint Technology, pp. 1210-1231 (1963).

Schroder, Colloid chemistry aids to formulating inks and paints, Harmonization of the energetics of raw materials by using the solubility parameter concept, vol. 5, No. 98, pp. 334-340 (no date).

Chasey, "Methods for evaluating oil/polymer interactions in carbon black filled compounds," Rubber World, pp. 35-40 (1993).

Wolff, et al., "Filler-elastomer interactions. Part VII. Study on bound rubber," Rubber Chemistry and Technology, vol. 66, No. 2, pp. 163-177 (1993).

Barton, "CRC Handbook of solubility parameters and other cohesion parameters," pp. 1-21, (1991).

Kaya, et al., "Interfacial parameters and work of adhesion in soil-liquid systems," Geotechnical Testing Journal, vol. 23, No. 4, pp. 464-471 (2000).

Skaarup, "The three dimensional solubility parameter and its use—II. Pigmented Systems," pp. 28-42 (no date).

Grubenmann, "The solvent dependence of the solubility of organic solids, and solubility parameter theory: investigation by means of an organic pigment," Dyes and Pigments, vol. 21, pp. 273-292 (1993).

Chibowski et al., "A Novel Method for Surface Free-Energy Determination of Powdered Solids," Journal of Colloid and Interface Science, vol. 240, pp. 473-479 (2001).

Holz, "Rheological Phenomina and Structure Formation in Multiphase Polymers," Feb. 2001, internet publication, pp. 1-5.

C4 Technologies, Inc. "Preliminary Program: Second International Symposium on Acid-Base Interactions: Relevance to Adhesion," Jul. 1998, internet publication, pp. 1-19.

The Society of Rheology, Journal of Rheology, vol. 41, issue 2, Apr. 1997, vol. 42, issue 3, May 2001, vol. 45, issue 4, Aug. 2001.

Dannenberg, "Bound Rubber and Carbon Black Reinforcement," Rubber Chemistry and Technology, vol. 59, pp. 512-524 (1986).

Wolff et al., "Filler-Elastomer Interactions. Part VII. Study on Bound Rubber," reprinted from Rubber Chemistry and Technology, vol. 66, No. 2, May-Jun. 1993, 163-177.

"Standard Test Method for Carbon Black—Iodine Adsorption Number," ASTM Designation D 1510-99, pp. 271-275.

"Standard Test Method for Carbon Black—CTAB (Cetyltrimethylammonium Bromide) Surface Area," ATSM Designation D 3765-99, pp. 563-568.

"Standard Test Methods for Carbon Black—Surface Area by Multipoint B.E.T. Nitrogen Adsorption," ATSM Designation D 4820-97, pp. 763-769.

"Standard Test Methods for Carbon Black—External Surface Area by Multipoint Nitrogen Adsorption," ATSM Designation D 5816-96, pp. 878-880.

"Standard Test Method for Carbon Black—Total and External Surface Area by Nitrogen Adsorption," ATSM Designation D 6556-00a, pp. 970-974.

Park et al., "Roles of Work of Adhesion between Carbon Blacks and Thermoplastic Polymers on Electrical Properties of Composites," Journal of Colloid and Interface Science, vol. 255, pp. 145-149 (2002).

Mukhopadhyay et al., "Component Interactions and the Stability of Some Pigment/Polymer Dispersions," Journal of Applied Polymer Science, vol. 67, pp. 245-253 (1998).

Clint, "Adhesion and Components of Solid Surface Energies," Current Opinion in Colloid & Interface Science, vol. 6, pp. 28-33 (2001).

Horn et al., "Estimation of the Reliability of Hansen-Parameters of Photooxidative Degraded Polymer Films by Contact Angle Measurements," Hildesheim, Germany, pp. 1-12.

Bismarck et al., "Basic and Acidic Surface Oxides on Carbon Fiber and Their Influence on the Expected Adhesion to Polyamide," Colloids and Surfaces, A: Physiochemical and Engineering Aspects vol. 159, pp. 341-350 (1999).

Cabot Brochure entitled: "Cabot Carbon Blacks for Specialty Applications," 2003.

Cabot Brochure entitled: "Black Pearls® Pigment for Molded Engineering Polymers," 2003.
Cabot Brochure entitled: "Engineered Pigment Black for Plastics, Coatings and Liquid Dispersions," 2004.
Cabot Brochure entitled: "High Color Pigment Black for Molded Engineering Polymers," 2004.
Cabot Brochure entitled: "Color Measurement for Carbon Black Filled Plastics," 2004.
Cabot Brochure entitled: "Black SAN Masterbatch for Molding and Compounding Applications," 2003.
Tikhonov, "On the evaluation of the work of adhesion, cohesion, and surface tension of high—viscous and solid bodies," Kolloidn Zh, vol. 53, No. 3, pp. 552-558 (1991) Abstract only.
Janczuk, et al., "Surface free energy components and adsorption properties of some porous glasses," Mater Chem Phys. vol. 25, No. 2, pp. 185-198 (1990) Abstract only.
Janczuk, et al., "Surface free energy of celestite and its flotation activity," Colloids Surf. vol. 35, No. 1, pp. 41-48 (1989) Abstract only.
Wojcik et al., "Gas-adsorption studies on correlations between the flotability of minerals and the work of water adhesion to their surfaces," Colloids Surf. vol. 30, No. 3-4, pp. 275-285 (1988) Abstract only.
Lipatov, "Adhesion at the polymer mixtures-solid interface," Vide, Couches Minces, vol. 50 (274), pp. 415-420 (1994) Abstract only.
Hill, "Wall slip in polymer melts: A pseudo-chemical model," J. Rheol. vol. 42, No. 3, pp. 581-601 (1998) Abstract only.
Scheie, "The upward force on liquid in a capillary tube," Am. J. Phys. vol. 57, No. 3, pp. 278-289 (1989) Abstract only.
Lee et al., "Effects of polymer-filler interaction on the mechanical properties of nylon 6,6 filled with organosilane-treated fillers," J. Adhes. Sci. Technol., vol. 3, No. 4, pp. 291-303 (1989) Abstract only.
Abramzon et al., "Determination of the work of adhesion and cohesion" ZH. Prikladnoi Khim, vol. 53, No. 5, pp. 1040-1043 (1980) Abstract only.
Mangipudi et al., Direct measurement of molecular level adhesion between poly(ethylene terephthalate) and polyethylene films: Determination of surface and interfacial energies, J. Adhesion Sci. Technol., vol. 8, No. 11, pp. 1251-1270 (1994) Abstract only.
Owen, "Surface properties of silicone release coatings," Proc. First Internat. Congress on Adhesion Science and Technology, pp. 255-263 (1995) Abstract only.
Kaya, The effect of pore fluid contamination on a selected physico-chemical parameters of fine grained soils (Adsorption, Conductivity), vol. 57-05B, p. 3354 (1996) Abstract only.
Qin, Adhesion properties of polymeric materials (Asphalts, Cohesion), vol. 57-02B, p. 1260 (1995) Abstract only.
Stepanov, "Electrocapillary behaviour of liquid bismuth in binary melts of strontium chloride with sodium and cesium chlorides," Ehlektrokhimiya, vol. 30, No. 8, pp. 1032-1038 (1994) Abstract only.
Kulawik, et al., "Kinetics of the molecular interactions in some extraction system," ISEC '88 International solvent extraction Conference, vol. 2, pp. 77-78 (1988) Abstract only.
Nardin et al., "Stress transfer analysis in fibre/elastomer interfaces," Comptes-Rendus des Huitiemes Journess Nationales sur les Composites, pp. 289-300 (1992) Abstract only.

Maugis, "Adherence and Fracture Mechanics," Adhesive Bonding, pp. 303-335 (1991) Abstract only.
Wan et al., "Surface forces at crack interfaces in mica in the presence of capillary condensation," Acta Metallurgia et Materialia, vol. 38, No. 11, pp. 2073-2083 (1990) Abstract only.
Savenko et al., "Effect of diamond-like carbon coatings on the mechanical properties of subsurface layers of single crystals of silicon," Physics and Chemistry of Materials Treatment, vol. 31, No. 2, pp. 149-153 (1997) Abstract only.
Lellig et al., "Glass and polymer: wetting and adhesion," Glass Science and Technology, vol. 69, No. 11, pp. 357-367 (1996) Abstract only.
Maugis, "Adherence of elastomers: fracture mechanics aspects," Journal of Adhesion, vol. 23, No. 1, pp. 61-66 (1987) Abstract only.
Riande et al., "Fundamental aspects of the adhesion of polymers," Revista de Plasticos Modernos, vol. 80, No. 530, pp. 170-179 (2000) Abstract only.
Gilbert, "Surface treatments for particulate fillers in plastics," Plastics Additivies. An A-Z reference, pp. 590-603 (1998) Abstract only.
Maltese, "Interfacial energy between polymers," Materie Plastiche ed Elastomeri, VBol. 64, Nos. ½ , pp. 74-78 (1999) Abstract only.
Cherry et al., "Predicting work of adhesion using molecular modeling," Adhesion '96, Conference Proced., vol. 1, pp. 299-304 (1996) Abstract only.
Feinerman et al., "Rule of interfacial equilibrium," J. Adhesion, vol. 60, Nos. 1-4, pp. 99-112, (1997) Abstract only.
Geraghty et al., "Investigation of parameters influencing bioadhesive properties of myverol 18-99/water gels," Biomaterials, vol. 18, No. 1, pp. 63-67 (1997) Abstract only.
Wimolkiatisak et al., Directly paintable, high adhesion polyolefin compounds, Plast'21 No. 43, pp. 44-47 (1995) Abstract only.
Drzal, et al., "Adhesion of carbon fibres to polycarbonate matrices: interphase composition and structure," Antec '95. vol. II, Conference Proceedings, pp. 2877-2881 (1995) Abstract only.
Moore, "Wetting in rubber-to-metal bonding agents," Rubb. Plast. News, vol. 24, No. 7, pp. 17-18 (1994) Abstract only.
Mangipudi et al., "Adhesion of thin polymer films: Effects of surface and interfacial energies and rheological properties," Antec '93 Conference Proceedings, vol. III, pp. 3099-3100, (1993) Abstract only.
Bautista et al., "Surface characterization of polypropylene used as a matrix in composite materials," Rev. Plast. Mod. vol. 66, No. 449, pp. 505-509 (1993) Abstract only.
Pritykin et al., "New thermodynamic characteristics of polymer adhesive properties," International Adhesion Conference, p. 11.1-3 (1984) Abstract only.
Moskvitin, Physicochemical Principles of Gluing and Adhesion processes, NSF, Rpt. No. SFCSI-Agr (TT-68-50368, p. 197 (1969) Abstract only.
Mayne, "Further developments with epoxy/polyamine films," Corros. Sci., vol. 35, Nos. 5/8, pp. 1359-1361 (1993) Abstract only.
Padday, "Spreading, wetting, and contact angles," J. Adhes. Sci. Tech., vol. 6, No. 12, pp. 1347-1358 (1992) Abstract only.
Mark, "Future improvements in cohesive and adhesive strength of polymers. I.," Adhesives Age, vol. 22, No. 7, pp. 35-40 (1979) Abstract only.

* cited by examiner

FIG. 1
Sample Dispersion Ratings

CARBON BLACKS AND POLYMERS CONTAINING THE SAME

BACKGROUND OF THE INVENTION

The present invention relates to novel carbon blacks, as well as polymers containing the carbon blacks, and an enhancement in properties, such as polymer performance and the like.

Carbon black is used in a number of polymer compounds, such as those found in acrylonitrile-butadiene-styrene (ABS) molding applications. Carbon black-filled polymer compounds, such as carbon black-filled ABS and ABS-alloys (blends of ABS with other polymers), are used in numerous high-performance polymer applications where a balance of color, mechanical properties, and surface appearance is preferred. The type and amount of carbon black used in the polymer can have a varying effect on the properties of the compound. For instance, increasing the loading of carbon black can improve the color (e.g., the compound has higher jetness), but the mechanical properties and/or surface appearance may be degraded with higher loadings. There is a desire in the polymer industry to have a carbon black that can achieve comparable or better jetness, blue tone, impact strength, and/or surface appearance (smoothness) when compounded into a polymer, but at a loading that is lower than current conventional loadings. Achieving equal color at a lower loading can involve using a carbon black with a higher surface area. However, increasing the surface area of carbon black typically causes the carbon black to become difficult to disperse. Further, poor dispersion of the carbon black results in a loss of mechanical properties and/or surface appearance. Thus, it would be desirable to develop a high-surface area carbon black that can be preferably readily dispersed in polymers, such as ABS, to attain an acceptable level of various mechanical properties (such as impact resistance) and surface appearance.

SUMMARY OF THE PRESENT INVENTION

A feature of the present invention is to provide carbon blacks that preferably provide equal color in polymer compounds at a lower loading and yet are dispersible to an acceptable level to maintain mechanical properties and surface appearance.

A further feature of the present invention is to provide a carbon black which when compounded in a polymer, such as ABS, provides an acceptable balance of properties, such as jetness, blue tone, impact strength, and surface appearance.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a carbon black that is characterized by having:

(a) an Iodine number of from about 150 to about 600 mg/g;

(b) a DBP absorption of from about 40 to about 90 cc/100 g; and (c) a nitrogen surface area/statistical thickness surface area (N2SA/STSA) of from about 1.25 to about 1.70; and the carbon black further has one or both of the following properties:

(d) a jetness as measured by Terlon L* of 1.7 or less and/or (e) a water spreading pressure of 23.0 J/m² or less.

The present invention further relates to a carbon black that, when compounded in acrylonitrile-butadiene-styrene at a loading of 1.5 wt % or less based on the overall weight of the compounded material, results in a compounded material having a compound jetness (L*) of 4.6 or less and one or both of the following characteristics:

(a) a compound notched Izod impact strength of 13,600 J/m² or greater and/or (b) a compound dispersion rating in a press-out test of 4.0 or less.

Also, the present invention relates to ABS compounds containing one or more types of the carbon blacks of the present invention.

Additionally, the present invention relates to polymers containing one or more of the carbon blacks of the present invention.

In addition, the present invention relates to polymer masterbatches or concentrates containing one or more of the carbon blacks of the present invention.

Further, the present invention relates to methods of making the carbon blacks of the present invention, as well as making the polymer compounds of the present invention.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

The present invention relates to novel carbon blacks, as well as methods to make the carbon blacks. The present invention also relates to the use of these carbon blacks in various polymers including, but not limited to, acrylonitrile-butadiene-styrene (ABS).

With respect to the carbon black, the carbon black of the present invention has desirable morphology and interfacial properties that make it beneficial in various applications, such as the use of the carbon black in polymer applications like ABS molding applications.

In more detail, in at least one embodiment, the carbon black of the present invention preferably has one or more of the following three characteristics and preferably has all of the following three characteristics:

(a) an Iodine number of from about 150 to about 600 mg/g. Other ranges can include an Iodine number of from about 265 to about 600 mg/g, from about 350 mg/g to about 600 mg/g, or from about 400 mg/g to about 600 mg/g;

(b) a DBP absorption of from about 40 to about 90 cc/100 g. Other ranges can include from about 50 to about 90 cc/100 g, from about 60 to about 90 cc/100 g, or from about 70 to about 90 cc/100 g;

(c) a ratio of nitrogen surface area/statistical thickness surface area of from about 1.25 to about 1.70. Other ranges can include from about 1.30 to about 1.70 or from about 1.40 to about 1.70.

In addition, in at least one embodiment, the carbon black of the present invention has one or more of the following additional properties:

(d) a jetness value as determined by Terlon L* of 1.7 or less. Other ranges can include from about 0.4 to about 1.7, or from about 0.4 to about 1.1;

(e) a water spreading pressure value of 23.0 mJ/m$^2$ or less. Other ranges include from about 12.0 to about 23.0 mJ/m$^2$ or from about 12.0 to about 21.5 mJ/m$^2$.

With respect to the Iodine number, this number is measured following ASTM D1510. With respect to the DBP absorption, this property is determined following ASTM D2414. With respect to the nitrogen surface area and the statistical thickness surface area, these measurements were made following ASTM D6556.

With respect to the jetness as determined by Terlon L*, this procedure uses a CIELAB color scale. L* is a measure of the jetness of the carbon black after making an oil-based paste; a lower value is more jet. The absolute L* value is used. In determining jetness, the carbon black was dried at 125° C. for 3 hours and then conditioned in a mixer for 45 seconds. 2.0 g of Terlon #1 Oil was then added to the lower plate of a Hoover Muller, into which 100 mg of the carbon black was slowly added with a spatula. After gathering the material in the center of the lower plate, the top plate was put in place and the Hoover Muller plates spun for 50 revolutions to mix the oil and carbon black. The plates were then opened, and the process of gathering the material and spinning for 50 revolutions was repeated three more times. The entire quantity of the paste was then smoothed onto a glass plate. The 1976 CIELAB L* value was measured in four different locations on the plate using a Hunter Labscan XE with VSI, using the following conditions: Mode=0/45, Port Size=1.2 inches, Area View=1 inch, UV Filter=Out, Light Source=D65 with 10° Observer. The value reported is the median of the four absolute L* values. Simultaneously, the 1976 CIELAB b* value (bluetone) is also measured and recorded by the Hunter Labscan in an analogous way.

Water spreading pressure is a measure of the interaction energy between the carbon black surface and water vapor. The spreading pressure is measured by observing the mass increase of a sample as it adsorbs water from a controlled atmosphere. In the test, the relative humidity (RH) of the atmosphere around the sample is increased from 0% (pure nitrogen) to ~100% (water-saturated nitrogen). If the sample and atmosphere are always in equilibrium, the water spreading pressure ($\pi_e$) of the sample is defined as:

$$\pi_e = \frac{RT}{A}\int_o^{P_o} \Gamma d\ln P$$

where R is the gas constant, T is the temperature, A is the specific surface area of the sample, $\Gamma$ is the amount of adsorbed water on the sample (converted to moles/gm), P is the partial pressure of water in the atmosphere, and $P_o$ is the saturation vapor pressure in the atmosphere. In practice, the equilibrium adsorption of water on the surface is measured at one or (preferably) several discrete partial pressures and the integral is estimated by the area under the curve. Alternative measurements of the interfacial properties or surface energy can be specified, e.g., by not dividing by the surface area, or by adding other interfacial properties or surface energy terms to the water spreading pressure, or by approximating the integral with a small number, even possibly as few as one, data points, or using other gases.

The procedure for measuring the water spreading pressure is detailed in "Dynamic Vapor Sorption Using Water, Standard Operating Procedure", rev. Feb. 8, 2005 (incorporated in its entirety by reference herein), and is summarized here. Before analysis, 100 mg of the carbon black to be analyzed was dried in an oven at 125° C. for 30 minutes. After ensuring that the incubator in the Surface Measurement Systems DVS1 instrument (supplied by SMS Instruments, Monarch Beach, Calif.) had been stable at 25° C. for 2 hours, sample cups were loaded in both the sample and reference chambers. The target RH was set to 0% for 10 minutes to dry the cups and to establish a stable mass baseline. After discharging static and taring the balance, approximately 8 mg of carbon black was added to the cup in the sample chamber. After sealing the sample chamber, the sample was allowed to equilibrate at 0% RH. After equilibration, the initial mass of the sample was recorded. The relative humidity of the nitrogen atmosphere was then increased sequentially to levels of approximately 5, 10, 20, 30, 40, 50, 60, 70, 78, 87, and 92% RH, with the system allowed to equilibrate for 20 minutes at each RH level. The mass of water adsorbed at each humidity level was recorded, from which water spreading pressure was calculated (see above). The measurement was done twice on two separate samples and the average value is reported.

In another embodiment of the present invention, the present invention relates to carbon black which is capable of achieving certain properties when compounded in ABS following a particular procedure. In more detail, in one embodiment of the present invention, the carbon black, when compounded in ABS at a carbon black loading of 1.5 wt % or less (for instance, at a carbon black loading of 0.1 wt % to 1.5 wt %), based on the overall weight of the compounded material, achieves a jetness (in the overall compounded material), measured as compound L* of 4.6 or less (other jetness values for the compounded material can be e.g., 3.0 to 4.6 or 3.0 to 4.4) and the carbon black permits the compounded material to have one or both of the following properties:

(a) a compound notched Izod impact strength of 13,600 J/m$^2$ or greater (other ranges include from about 13,600 J/m$^2$ to about 18,000 J/m$^2$, from about 14,000 to about 17,000 J/m$^2$) and/or (b) a compound dispersion rating in a press-out test of 4.0 or less (other ranges include e.g., from about 1.0 to about 4.0 or from about 1.0 to about 3.0). The carbon black in this embodiment has these properties for at least one carbon black loading level in this range of 1.5 wt. % or less.

With respect to these parameters that the carbon black promotes in an ABS when compounded in the ABS, the following test procedures are used.

The ABS compounds were produced in a three step compounding procedure (at times referred to as "the three step ABS compounding procedure"): First, a 30% SAN masterbatch was prepared, which was then diluted to 5% with ABS, before being let down to 0.50% to 1.50% with additional ABS in a final injection molding step.

Masterbatch Compound: The SAN masterbatch was prepared by mixing carbon black (CB), Tyril 124 SAN (Density=1080 kg/m$^3$, 230° C./3.8 kg MFI=22 g/10 min), and Zinc Stearate (ZnSt) in the following proportions by weight: 30.0% CB, 69.5% SAN, and 0.5% ZnSt, to give a total mass of the three components of 1413 g. The components were mixed in a Banbury internal mixer (1570 ml) with the following settings: Rotor Speed=Setting 2, Ram Pressure=3 kg/cm$^2$, Initial Temperature=70° C., Post Flux Mixing Time=90 s, and Feeding Factor=75%.

5% ABS Compound: The SAN masterbatch was first ground to remove dust and small particles. 250 g of the SAN masterbatch was then mixed with 1250 g of Cycolac GPM5500 ABS (Density=1050 kg/m$^3$, 220° C./10 kg MFI=24 g/10 min, 23° C. Notched Izod Impact (ISO180/1A) =18000 J/m$^2$) to produce a 5% ABS compound. This procedure was carried out on a Betol BK32 single screw extruder equipped with a distributive mixing head (cavity transfer mixer (CTM)) to improve its dispersive capabilities. The extruder had the following temperature settings from the feeder to the die: Zone1=180° C., Zone2=185° C., Zone3=190° C., Zone4=195° C., CTM=210° C., Die=200° C. The screw speed was 80 rpm and one pass was used during compounding.

0.50-1.50% ABS Compound: The 5% ABS compounds were diluted to their final loading in a Battenfeld BA500/200CD injection-molding machine. The total mass of material used was 600 g, with the proportions of 5% ABS compound and pure Cycoloac GPM5500 ABS selected to give the correct final loading. Before injection, the ABS compounds and the ABS resin were dried for 17 hours at 80° C. under vacuum. Between each sample, 500 g of pure ABS was injected to clean the equipment. The exact injection molding parameters depended on the test that the part was to be subjected to (see below):

Color (L*) Plaques: 90×55×2 mm plaques for color analysis were prepared using the following temperature settings on the injection molding machine: Nozzle=225° C., Zone1=235° C., Zone2=250° C., Zone3=250° C., Mold=60° C. The injection speed was 20%.

Izod Impact Bars: 63.5×12.7×6.4 mm bars (ISO 180 Type 3) for Izod impact testing were prepared using the following temperature settings on the injection molding machine: Nozzle=225° C., Zone1=235° C., Zone2=250° C., Zone3=250° C., Mold=25° C. The injection speed was 60%.

With respect to the jetness for the compound, the compound L* is an absolute value. L* is a measure of the jetness of the compound; a lower value is more jet. To measure the compound L*, six 90×55×2 mm color plaques with the desired loading were prepared by injection molding as described above. All plaques were inspected to ensure that they had a uniform color on the surface, and to check for any pips or streaks. Plaques that did not meet these criteria were discarded. Each plaque was then tested once for the 1976 CIELAB L* value with a DATACOLOR SF600 spectrophotocolorimeter, using the following conditions: Calibration Mode=Reflectance, Specular Door=Excluded, Visualization=LAV (30 mm), UV=Included, Condition=% R LAV SC E UV inc., Light Source=D65 with 10° Observer. The value reported is the average of the six plaques and is the absolute L* value, not a difference between the sample and a reference. Simultaneously, the 1976 CIELAB b* value (bluetone) of the compound was measured and recorded by the Datacolor instrument in an analogous way.

With respect to determining the notched Izod impact strength of the compounded material, the test was generally based on the ISO 180-1982 standard, but differed in the injection molding procedure of the test bars. The test method is described below.

Ten 63.5×12.7×6.4 mm bars (ISO 180 Type 3) with the desired loading were prepared by injection molding as described above. A single notch (ISO 180 Type A) was then cut in each bar with a notching device (CEAST 6530). The sample was loaded with the notch facing the direction of impact and tested with a 5.5 J pendulum-type hammer (CEAST 6545/000). If a bar showed bubbles or holes along the fracture point, it was discarded. The measured impact strength of acceptable samples was recorded and the reported value is the average of the ten bars. Un-notched Izod impact strength can be measured by following the same procedure but without cutting the notch in the test bar.

The dispersion rating in the press-out test of the compounded material is described below. The dispersion rating is a semi-quantitative measure of carbon black dispersion in the compound; a lower value equals better dispersion.

Figure 1:
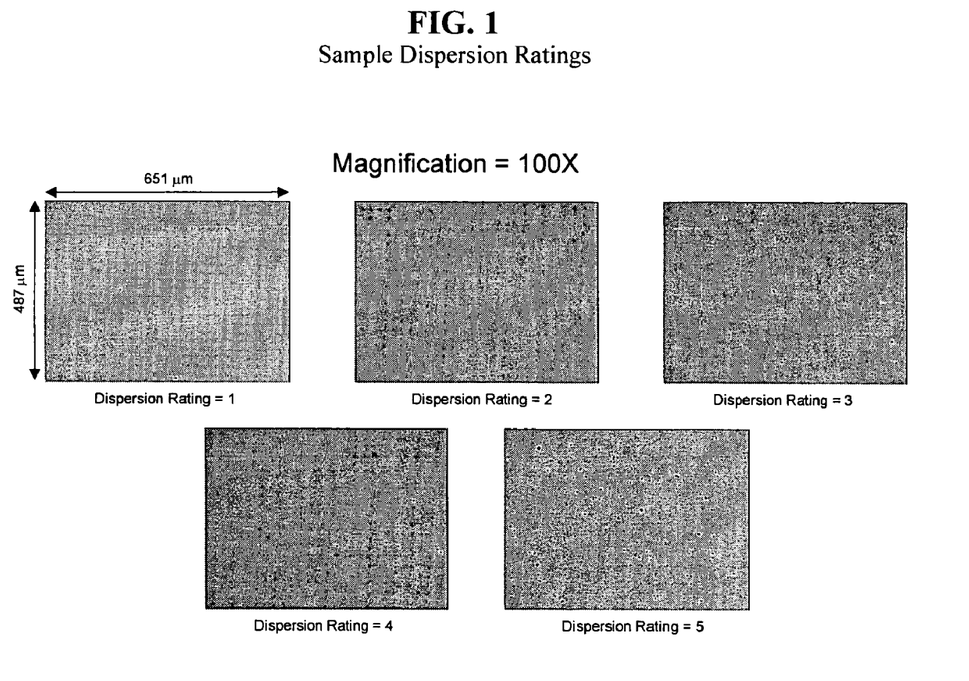
FIG. 1 is five photographs showing sample dispersion ratings.

Two 0.3 mg "buttons" were cut from three different color plaques (preparation described above) yielding six buttons. Each button was placed on a clean microscope slide and covered with another slide. The assembly was pressed-out at 210° C. for 3 minutes, with enough pressure to obtain a 5 mm button diameter. Each button was examined at 200× and 100× magnification in a light microscope. A rating of 1-5 was then assigned to each button, with 1 corresponding to a good dispersion and 5 to a bad dispersion. In assigning the dispersion rating, good dispersion implies a few black spots were visible whereas bad dispersion implies a lot of black spots or larger aggregates. More specifically, the dispersion rating is assigned by counting the number of visible particles greater than 1 μm in a 651 μm×487 μm area under 100× magnification. The number of particles determines the dispersion rating: 1=0-10 particles, 2=11-30 particles, 3=31-60 particles, 4=61-150 particles, 5=more than 150 particles. The dispersion rating of each sample is the average from the six buttons. FIG. 1 is photographs showing an example of compounds with dispersion ratings from 1 to 5.

With respect to manufacturing the carbon blacks, the carbon blacks can be made as follows. The carbon blacks of the present invention can be produced in a tubular furnace reactor similar to those described in U.S. Pat. Nos. 6,156,837 and 5,877,250, incorporated in their entireties by reference herein. The reactor illustrated in FIG. 1 of that patent has (a) an initial combustion zone, (b) a secondary combustion zone, (c) a reaction zone, and (d) a quenching zone.

In the present invention, a reaction like that shown in U.S. Pat. Nos. 6,156,837 and 5,877,250 is used with the adjustments described herein. In the initial combustion zone, fuel and an oxidant are mixed and reacted to form a hot combustion gas stream. Suitable fuels for generating the hot combustion gases include any readily combustible fluid, including natural gas, hydrogen, carbon monoxide, methane, acetylene, or liquid hydrocarbon feedstock. The oxidant can be either preheated air or preheated oxygen-enriched air, with an oxygen content (by volume) of between 21 and 30% and a temperature of 300 to 750° C. Preferably, the oxygen content of the oxidant is between 21 and 25% and the temperature is between 450 and 750° C. If the fuel is natural gas, the ratio of oxidant to fuel in this initial zone is between 1 and 4 times the amount of oxidant needed for stoichiometric combustion, and preferably between 1 and 2 times.

This zone is followed by a secondary combustion zone, where the hot combustion gases are contacted with a mixture of alkali salts and a liquid hydrocarbon feedstock that is readily volatilized. Suitable liquid feedstocks include unsaturated hydrocarbons, saturated hydrocarbons, olefins, aromatics, and other hydrocarbons such as kerosenes, naphthalenes, terpenes, ethylene tars, and aromatic cycle stocks, as well as mixtures of all of the above. The feedstock is often injected in a plurality of streams that rapidly mix with the hot initial combustion gases, causing the carbon black-yielding feedstock to decompose and convert to carbon black. In the process of the present invention, the overall ratio of oxidant to both fuels (including that in the first zone) is between 0.15 and 0.50 times the amount of oxidant needed for stoichiometric combustion. Preferably, the overall ratio is between 0.25 and 0.40. The concentration of alkali salts in the feedstock is in the range of 0.03 to 0.15% by weight.

In the third zone of the reaction, the mixture of combustion gases and carbon black continues to react as it flows downstream until it reaches the fourth zone of the reactor, where a quenching fluid is introduced to stop the reaction. Suitable quenching fluids include water, a mixture of water and steam, or a mixture of water and air. The ideal location of the quench (and therefore the residence time of the reaction) depends on the flow rate of the gases and the diameter of the furnace. In general, the residence time of the reaction should be 10 and 200 ms, and preferably between 60 and 150 ms (milliseconds).

After adding the quenching fluid, the mixture is passed to any conventional cooling apparatus, such as a venturi cooler or a heat exchanger, at which point the carbon black is separated from the gas stream by conventional means such as a precipitator, cyclone separator, or bag filter. If desired, the carbon black can be pelletized by any wet or dry means.

The carbon blacks of the present invention can be produced by varying the reactor parameters described above to produce the desired morphology, interfacial properties, and inherent jetness. Increasing the stoichiometric ratio of oxidant to fuel increases the Iodine number, while increasing the amount of alkali salts decreases the DBP absorption. At a given morphology, the interfacial properties can be controlled by manipulating the oxygen enrichment of the oxidant stream and the residence time of the reaction (by moving the quench position). For example, increasing the oxygen enrichment of the oxidant stream changes the morphology and/or interfacial properties such that the carbon black has a higher Terlon L* value. Increasing the residence time increases the N2SA/STSA ratio and increases the water spreading pressure.

The carbon blacks used in the polymer compositions of the present invention can optionally be further treated with a variety of treating agents, such as binders and/or surfactants. The treating agents described in U.S. Pat. Nos. 5,725,650; 5,200,164; 5,872,177; 5,871,706; and 5,747,559, all incorporated herein in their entirety by reference, can be used in treating the carbon blacks of the present invention. Other preferred treating agents, including surfactants and/or binders, can be used and include, but are not limited to, polyethylene glycol; alkylene oxides such as propylene oxides and/or ethylene oxides, sodium lignosulfate; acetates such as ethylvinyl acetates; sorbitan monooleate and ethylene oxide; ethylene/styrene/butylacrylates/methyl methacrylate binders; copolymers of butadiene and acrylonitrile; and the like. Such binders are commercially available from such manufacturers as Union Carbide, Dow, ICI, Union Pacific, Wacker/Air Products, Interpolymer Corporation, and B.F. Goodrich. These binders are preferably sold under the trade names: Vinnapas LL462, Vinnapas LL870, Vinnapas EAF650, Tween 80, Syntran 1930, Hycar 1561, Hycar 1562, Hycar 1571, Hycar 1572, PEG 1000, PEG 3350, PEG 8000, PEG 20000, PEG 35000, Synperonic PE/F38, Synperonic PE/F108, Synperonic PE/F127, and Lignosite-458. Generally the amount of treating agent used with the carbon blacks of the present invention can be the amounts recited in the above-described patents, for instance in an amount of from about 0.1% to about 50% by weight of the treated carbon black, though other amounts can be used depending upon the type of properties desired and the particular treating agent(s) being used. The carbon black used in the polymer compositions of the present invention can also be modified to form a modified carbon black having attached at least one organic group. The type of organic group will vary depending on the polymer used as well as on the desired performance properties. This allows for greater flexibility by tailoring the modified carbon black to the specific application.

The carbon blacks can be modified using methods known to those skilled in the art such that organic groups are attached to the carbon black. This provides a more stable attachment of the groups onto the carbon black compared to adsorbed groups, such as polymers, surfactants, and the like. For example, the modified carbon blacks can be prepared using the methods described in U.S. Pat. Nos. 5,554,739, 5,851,280, 6,042,643, 5,707,432, and 5,837,045, and PCT Publication WO 99/23174, the descriptions of which are fully incorporated herein by reference.

Also, for purposes of the present invention, the carbon black, as defined by its property capabilities when compounded in ABS, can have one or more of the properties described above with respect to Iodine number, DBP absorption, nitrogen surface area/statistical thickness surface area ratio, jetness, as determined by Terlon L*, and/or the water spreading pressure properties. Similarly, the carbon black properties having the Iodine number, DBP absorption, and nitrogen surface area/statistical thickness surface area ratio can have one or more of the carbon black properties measured when compounded in ABS as described above.

In a further embodiment of the present invention, the present invention relates to an ABS compound that contains ABS and at least one carbon black of the present invention. The present invention further relates to an ABS compound that contains ABS and at least one carbon black of the present invention wherein the ABS compound has the carbon black loading as described above, along with the compound jetness, and compound notched Izod impact strength, as described above.

In another embodiment of the present invention, the present invention relates to an ABS compound that contains ABS and at least one carbon black of the present invention wherein the ABS compound has the carbon black loading as described above, along with the compound jetness as described above and the compound dispersion rating in press-out test as described above.

In a further embodiment of the present invention, the present invention relates to an ABS compound that contains ABS and at least one carbon black of the present invention, wherein the ABS compound has the carbon black loading as described above, along with the compound jetness as described above, the compound notched Izod impact strength as described above, and the compound dispersion rating in press-out tests as described above.

A further embodiment of the present invention relates to an ABS compound that contains ABS and at least one carbon black of the present invention, wherein the ABS compound has a compound jetness as described above and a compound notched Izod impact strength as described above without any limit on the carbon black loading.

An additional embodiment of the present invention relates to an ABS compound that contains ABS and at least one carbon black of the present invention wherein the ABS compound has the compound jetness as described above and the compound dispersion rating in press-out tests as described above without any limit on the carbon black loading.

A further embodiment of the present invention relates to an ABS compound that contains ABS and at least one carbon black of the present invention wherein the ABS compound has the compound jetness as described above, the compound notched Izod impact strength as described above, and the compound dispersion rating in press-out tests as described above, without any limit on the carbon black loading.

Furthermore, in the present invention, the ABS compound can contain one or more other types of polymers to form an ABS alloy as that term is understood to those skilled in the art. The ABS compound or ABS alloy contains at least one type of carbon black as described above. Furthermore, other types of carbon blacks, such as conventional carbon blacks, can further be present, and/or other reinforcing additives can be present. Also, other conventional ingredients typically used in ABS compounds and ABS alloys can further be present in the present invention including, but not limited to, other conventional components that can be used in polymer compositions.

In a further embodiment of the present invention, the present invention relates to a polymer compound that contains at least one polymer and at least one carbon black of the present invention. The present invention further relates to a polymer compound that contains at least one polymer and at least one carbon black of the present invention wherein the polymer compound has the carbon black loading as described above, along with the compound jetness as described above, and the compound notched Izod impact strength as described above.

In another embodiment of the present invention, the present invention relates to a polymer compound that contains at least one polymer and at least one carbon black of the present invention wherein the polymer compound has the carbon black loading as described above, along with the compound jetness as described above and the compound dispersion rating in press-out tests as described above.

In a further embodiment of the present invention, the present invention relates to a polymer compound that contains at least one polymer and at least one carbon black of the present invention, wherein the polymer compound has the carbon black loading as described above, along with the compound jetness as described above, the compound notched Izod impact strength as described above, and the compound dispersion rating in press-out tests as described above.

A further embodiment of the present invention relates to a polymer compound that contains at least one polymer and at least one carbon black of the present invention wherein the polymer compound has a compound jetness as described above and a compound notched Izod impact strength as described above without any limit on the carbon black loading.

An additional embodiment of the present invention relates to a polymer compound that contains at least one polymer and at least one carbon black of the present invention wherein the polymer compound has the compound jetness as described above and the compound dispersion rating in press-out tests as described above without any limit on the carbon black loading.

A further embodiment of the present invention relates to a polymer compound that contains at least one polymer and at least one carbon black of the present invention wherein the polymer compound has the compound jetness as described above, the compound notched Izod impact strength as described above, and the compound dispersion rating in press-out tests as described above, without any limit on the carbon black loading.

Furthermore, in the present invention, the polymer compound can contain one or more types of polymers to form a polymer alloy as that term is understood to those skilled in the art. The polymer compound or polymer alloy contains at least one type of carbon black as described above. Furthermore, other types of carbon blacks, such as conventional carbon blacks, can further be present, along with other reinforcing agents. Also, other conventional ingredients typically used in polymer compounds and polymer alloys can further be present in the present invention including, but not limited to, other conventional components that can be used in polymer compositions.

In more detail, the acrylonitrile-butadiene-styrene copolymer type resin to be used in the present invention is one composed mainly of a copolymer having three components of acrylonitrile, butadiene and styrene, and a commercially available product may be used. For example, a copolymer obtained by block or graft polymerization of at least one monomer selected from an aromatic vinyl monomer and a vinyl cyanide monomer to a diene type rubber, or a blended product with the copolymer, may be mentioned. The diene type rubber is a polymer obtained by polymerizing butadiene as a component, and examples of which include polybutadiene, polyisoprene, an acrylonitrile-butadiene copolymer and a styrene-butadiene copolymer. The aromatic vinyl monomer may, for example, be styrene, alpha-methylstyrene or an alkyl-substituted styrene. The vinyl cyanide monomer may, for example, be acrylonitrile, methacrylonitrile or a halogen-substituted acrylonitrile. Specific examples of the copolymer and the blended product with the copolymer include an acrylonitrile-butadiene-styrene terpolymer and one obtained by polymer-alloying a polybutadiene to an acrylonitrile-styrene copolymer. Further, an acrylonitrile-styrene copolymer containing no rubber component is also included.

With respect to the polymer present in the polymer compositions of the present invention, the polymer can be any polymeric compound. Preferably, the polymer is one that is useful in molding applications, such as a polyolefin, a vinyl-halide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, or a polyurethane. Polymers or resins useful in the practice of the invention include PET or polyethylene terephthalate, polystyrene, PBT or polybutylene terephthalate and PBT alloys, polypropylene, polyurethane, ABS or acrylonitrile-butadiene-styrene copolymer, PVC or polyvinyl chloride, polyesters, polycarbonates, PP/PS or polypropylene polystyrene alloys, polyethylene, nylon, polyacetal, SAN or styrene acrylonitrile, acrylics, cellulosics, polycarbonate alloys and PP or propylene alloys. Other combinations of these materials may be used. The foregoing list is not meant to be exhaustive but only illustrative of the various materials useful in the practice of this invention. Blends of polymers containing one or more of these polymeric materials, where the described polymers are present either as the major component or the minor component, may also be used. The specific type of polymer can depend on the desired application. These are described in more detail below.

It may be preferable to use specific polymers or blends in order to attain the desired performance properties. For example, the polymers can include thermoplastic polyolefins (TPO), polyethylene (PE), polypropylene (PP), copolymers of propylene, ethylene propylene rubber (EPR), ethylene propylene diene terpolymers (such as EPDM), acrylonitrile butadiene styrene (ABS), acrylonitrile EPDM styrene (AES), polyvinylchloride (PVC), polystyrene (PS), polyamides (PA, such as PA6, PA66, PA11, PA12, and PA46), polycarbonate (PC), polybutylene terephthalate (PBT), polyethylene terephthalate (PET), polyphenylene oxide (PPO), and polyphenylene ether (PPE). Preferred polymer blends include, but are not limited to, PC/ABS, PC/PBT, PP/EPDM, PP/EPR, PP/PE, PA/PPO, and PPO/PP. The polymer compositions of the present invention can be optimized to attain the desired overall properties, such as jetness, conductivity, toughness, stiffness, smoothness, and tensile properties.

Polymers include thermoplastic polyolefins (TPO), polyethylene (PE, such as LLDPE, LDPE, HDPE, UHMWPE, VLDPE, and mLLDPE), polypropylene, copolymers of polypropylene, ethylene propylene rubber (EPR), ethylene propylene diene terpolymers (such as EPDM), acrylonitrile butadiene styrene (ABS), acrylonitrile EPDM styrene (AES), polyoxymethylene (POM), polyamides (PA, such as PA6, PA66, PA11, PA12, and PA46), polyvinylchloride (PVC), tetraethylene hexapropylene vinylidenefluoride polymers (THV), perfluoroalkoxy polymers (PFA), polyhexafluoropropylene (HFP), polyketones (PK), ethylene vinyl alcohol (EVOH), copolyesters, polyurethanes (PU), polystyrene (PS), polycarbonate (PC), polybutylene terephthalate (PBT), polyethylene terephthalate (PET), polypheneylene oxide (PPO), and polyphenylene ether (PPE). Preferred blends include PC/ABS, PC/PBT, PP/EPDM, PP/EPR, PP/PE, PA/PPO, and PPO/PE.

The polymer(s) can be a thermoplastic polymer or a thermosetting polymer. Further, the polymer group can be a homopolymer, copolymer, terpolymer, and/or a polymer containing any number of different repeating units. Further, the polymer group present in the present invention can be any type of polymer group, such as a random polymer, alternating polymer, graft polymer, block polymer, star-like polymer, and/or comb-like polymer. The polymer group used in the present invention can also be one or more polyblends. The polymer group can be an interpenetrating polymer network (IPN); simultaneous interpenetrating polymer network (SIN); or interpenetrating elastomeric network (IEN).

Specific examples of polymers include, but are not limited to, linear-high polymers such as polyethylene, poly(vinylchloride), polyisobutylene, polystyrene, polycaprolactam (nylon), polyisoprene, and the like. Other general classes of polymers of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polysiloxanes, poly(vinyl alcohols), polyurethanes, thermoplastic elastomers, and the like. The polymer can be a polyolefin, a polyurethane, a polystyrenic, a polyacrylate, a polyamide, a polyester, or mixtures thereof.

Generally, the polymeric groups described in Volume 18 of the Encyclopedia of Chemical Technology, KIRK-OTHMER, (1982), page 328 to page 887, and Modern Plastics Encyclopedia '98, pages B-3 to B-210, and "Polymers: Structure and Properties," by C. A. Daniels, Technomic Publishing Co., Lancaster, Pa. (1989), all incorporated in their entirety herein by reference, can be used as the polymer(s). The polymers can be prepared in a number of ways and such ways are known to those skilled in the art. The above referenced KIRK-OTHMER section, Modern Plastics Encyclopedia, and C. A. Daniels' reference provide methods in which these polymers can be prepared.

The polymer compositions of the present invention may also include suitable additives for their known purposes and amounts. For example, the compositions of the present invention may also include such additives as crosslinking agents, vulcanizing agents, stabilizers, pigments, dyes, colorants, metal deactivators, oil extenders, lubricants, and/or inorganic fillers, and the like.

The polymer compositions of the present invention can be prepared using conventional techniques such as mixing the various components together using commercially available mixers. The composition may be prepared by batch or continuous mixing processes such as those well known in the art. For example, equipment such as discontinuous internal mixers, continuous internal mixers, reciprocating single screw extruder, twin and single screw extruder, etc. may be used to mix the ingredients of the formulations. The carbon black may be introduced directly into the polymer blend, or the carbon black may be introduced into one of the polymers before that polymer is blended with another polymer. The components of the polymer compositions of the present invention may be mixed and formed into pellets for future use in manufacturing such materials as articles for automotive applications.

With respect to the amount of carbon black, any amount can be used in the polymer compositions in order to achieve the desired properties. For instance, from about 0.5 wt % to about 50 wt %, based on the overall weight of the polymer composition, can be used, and more preferably, from about 0.5% to about 10% by weight based on the overall weight of the polymer composition.

In a further embodiment of the present invention, the present invention relates to a masterbatch or concentrate containing one or more carbon blacks of the present invention. The masterbatch or concentrate can contain one or more polymers, such as those described above, along with a masterbatch or concentrate amount of a carbon black of the present invention. The carbon black loading can be any suitable amount typically found in masterbatches or concentrates, such as from about 10 wt % to about 50 wt % based on the overall weight of the masterbatch or concentrate.

The carbon blacks of the present invention can be used in any end use application where conventional carbon blacks are used, e.g., inks, coatings, elastomeric products, toners, fuel cells, tires or parts thereof, molded parts, cables or parts thereof, and the like, using conventional amounts or lower.

The present invention will be further clarified by the following examples, which are intended to be exemplary of the present invention.

EXAMPLES

Three carbon blacks, identified as "A", "B", and "C" of the present invention and having the properties set forth in the Table 1 below, were prepared as described above and in Table 1. These carbon blacks are compared to two commercially available carbon blacks from Cabot, designated "X" and "Y" in the table below, and the analytical data for each of these carbon blacks are set forth in the table as well. Using procedures described above, all of these carbon blacks were formulated into an ABS compound using the loadings indicated in the table next to sample identification number. For instance, carbon black "X" was formulated with a carbon black loading of 0.75% by weight of the overall ABS compound, and carbon black "X" was also formulated with a carbon black loading of 0.5% by weight of the overall compound, and so on. As a comparative, an ABS compound containing no carbon black whatsoever (indicated as "Pure ABS" in the table below) was analyzed as well. Using the test procedures described above, the various physical properties of the compounded polymers were measured, including notched and un-notched Izod impact strength, press-out dispersion rating, and jetness (L*), using the procedures previously described. As can be seen from the data set forth in the table, the carbon blacks of the present invention, when compounded at 0.50%, were able to equal or exceed the compound jetness of carbon black "X" compounded at 0.75%. In addition, the carbon blacks of the present invention had a superior impact strength (both notched and un-notched) and press-out rating when compounded to give equal or better jetness as carbon black "X". This is not the case for comparative carbon black "Y", which showed a similar jetness to the carbon blacks of the present invention when compounded at 0.5%, but which showed a poorer impact strength and press-out dispersion rating. The carbon blacks of the present invention have a high surface area and strong jetness but remain relatively easy to disperse.

specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. Carbon black comprising the following three characteristics:
   (a) an Iodine number of from about 150 to about 600 mg/g;
   (b) a DBP absorption of from about 40 to about 90 cc/100 g;

TABLE 1

Process Conditions

| | Sample ID | | | | |
|---|---|---|---|---|---|
| | CB "X" | CB "Y" | CB "A" | CB "B" | CB "C" |
| Air Temperature (° C.) | 625 | 625 | 525 | 525 | 525 |
| Oxygen Content in Air (mol %) | 20.9 | 20.9 | 23.0 | 23.0 | 23.0 |
| Oxidant/Gas Stoichiometric Ratio$^a$ | 1.22 | 1.22 | 1.22 | 1.26 | 1.25 |
| Oxidant/Total Fuel Stoichiometric Ratio$^a$ | 0.347 | 0.366 | 0.331 | 0.342 | 0.342 |
| Potassium Concentration in Liquid Fuel (ppm) | 179 | 288 | 203 | 273 | 273 |
| Residence Time (ms) | 46 | 6 | 99 | 99 | 149 |

Analytical Data

| | Sample ID | | | | |
|---|---|---|---|---|---|
| | CB "X" | CB "Y" | CB "A" | CB "B" | CB "C" |
| Iodine # | 254 | 256 | 341 | 387 | 438 |
| N2SA | 234 | 250 | 295 | 332 | 367 |
| STSA | 190 | 224 | 207 | 224 | 227 |
| N2SA/STSA | 1.23 | 1.12 | 1.43 | 1.48 | 1.62 |
| DBP | 68 | 64 | 69 | 68 | 72 |
| Terlon L* | 1.40 | 0.78 | 1.10 | 0.87 | 0.90 |
| Terlon b* | −0.69 | −0.56 | −0.69 | −0.74 | −0.73 |
| Water Spreading Pressure (mJ/m$^2$) | 22.9 | 21.7 | 20.9 | 20.1 | 21.1 |

ABS Performance Data

| | Sample ID | | | | | | |
|---|---|---|---|---|---|---|---|
| | CB "X" 0.75% | CB "X" 0.5% | CB "Y" 0.5% | CB "A" 0.5% | CB "B" 0.5% | CB "C" 0.5% | Pure ABS |
| Compound L* | 4.35 | 4.88 | 4.42 | 4.40 | 4.36 | 4.14 | |
| Compound b* | −1.59 | −1.70 | −1.56 | −1.69 | −1.64 | −1.58 | |
| Notched Impact Strength (J/m$^2$) | 12900 | 14300 | 12900 | 14700 | 14200 | 14000 | 17200 |
| Un-notched Impact Strength (J/m$^2$) | 36500 | 42900 | 35400 | 41700 | 40900 | 40200 | 41600 |
| Press-out Dispersion Rating | 4 | 2 | 5 | 2 | 3 | 3.5 | |

Carbon blacks "X" and "Y" are carbon blacks shown for comparative purposes.
Carbon blacks "A", "B", and "C" are carbon blacks of the present invention.
$^a$Stoichiometric ratios are defined as the amount of oxygen present in the oxidant stream, divided by the amount of oxygen required for stoichiometric combustion of the fuel stream(s).

Applicants specifically incorporate the entire contents of all cited references in this disclosure. Further, when an amount, concentration, or other value or parameter is given as either a range, preferred range, or a list of upper preferable values and lower preferable values, this is to be understood as (c) a ratio of nitrogen surface area/statistical thickness surface area of from about 1.25 to about 1.70; and said carbon black has one or more of the following additional properties:

(d) jetness value as determined by Terlon L* of 1.7 or less; and/or (e) a water spreading pressure value of 23.0 mJ/m² or less.

2. The carbon black of claim 1, wherein said Iodine number is from about 265 to about 600 mg/g.

3. The carbon black of claim 1, wherein said Iodine number is from about 350 mg/g to about 600 mg/g.

4. The carbon black of claim 1, wherein said Iodine number is from about 400 mg/g to about 600 mg/g.

5. The carbon black of claim 1, wherein said DBP absorption is from about 50 to about 90 cc/100 g.

6. The carbon black of claim 1, wherein said DBP absorption is from about 60 to about 90 cc/100 g.

7. The carbon black of claim 1, wherein said DBP absorption is from about 70 to about 90 cc/100 g.

8. The carbon black of claim 1, wherein said ratio is from about 1.30 to about 1.70.

9. The carbon black of claim 1, wherein said ratio is from about 1.40 to about 1.70.

10. The carbon black of claim 1, wherein said carbon black has said jetness value and said water spreading pressure value.

11. The carbon black of claim 1, wherein said jetness value is from about 0.4 to about 1.7.

12. The carbon black of claim 1, wherein said jetness value is from about 0.4 to about 1.1.

13. The carbon black of claim 1, wherein said water spreading pressure value is from about 12.0 to about 23.0 mJ/m².

14. The carbon black of claim 1, wherein said water spreading pressure value is from 12.0 to about 21.5 mJ/m².

* * * * *